United States Patent [19]
Lavine et al.

[11] Patent Number: 5,946,512
[45] Date of Patent: Aug. 31, 1999

[54] COMPACT CAMERA WITH VARIABLE POSITION HANDGRIP

[75] Inventors: Monte D. Lavine; Stanley H. Caplan, both of Rochester; Philip R. Ashe, Hilton, all of N.Y.

[73] Assignee: Eastman Kodak Company, Rochester, N.Y.

[21] Appl. No.: 09/038,577

[22] Filed: Mar. 11, 1998

[51] Int. Cl.[6] .................................................. G03B 17/24
[52] U.S. Cl. .......................... 396/423; 396/424; 396/425
[58] Field of Search ..................................... 396/420, 423, 396/424, 425, 299; 348/333, 373, 376; 358/906, 909.1

[56] References Cited

U.S. PATENT DOCUMENTS

| | | |
|---|---|---|
| 4,959,729 | 9/1990 | Fukuda et al. ........................... 358/906 |
| 5,043,822 | 8/1991 | Ichiyoshi et al. ....................... 358/906 |
| 5,166,840 | 11/1992 | Nemoto et al. ......................... 358/906 |

*Primary Examiner*—David M. Gray
*Attorney, Agent, or Firm*—Roger A. Fields

[57] ABSTRACT

A camera comprising a spindle for supporting an image recording disk to be rotated about a center axis, and a handgrip which is to be hand held at an angular position, is characterized in that the handgrip is supported for rotation about the center axis to vary the angular position at which the handgrip is hand held.

3 Claims, 3 Drawing Sheets

COMPACT CAMERA WITH VARIABLE POSITION HANDGRIP

FIELD OF THE INVENTION

The invention relates generally to the field of photography, and in particular to cameras. More specifically, the invention relates to a compact camera with a variable position handgrip.

BACKGROUND OF THE INVENTION

It is useful for a camera to include some sort of a built-in handgrip which is manually gripped to steady the camera during picture-taking. The handgrip, of course, tends to make the camera less compact. This problem is particularly noteworthy in the type of camera commonly referred to as a "camcorder". In the camcorder-type camera a main body part includes a spindle for rotating an image recording disk about a center axis, and a handgrip is hand held at a desired angular orientation. The handgrip is often located beneath or adjacent one side of a main body part and is pivotable. This arrangement is less than compact.

SUMMARY OF THE INVENTION

A camera comprising a spindle for supporting an image recording disk to be rotated about a center axis, and a handgrip which is to be hand held at an angular position, is characterized in that;

the handgrip is supported for rotation about the center axis to vary the angular position at which the handgrip is hand held.

DETAILED DESCRIPTION OF THE INVENTION

The invention is disclosed as being embodied preferably in a camcorder-type camera. Because the features of a camcorder-type camera are generally known, the description which follows is directed in particular only to those elements forming part of or cooperating directly with the disclosed embodiment. It is to be understood, however, that other elements may take various forms known to a person of ordinary skill in the art.

Figure 1:
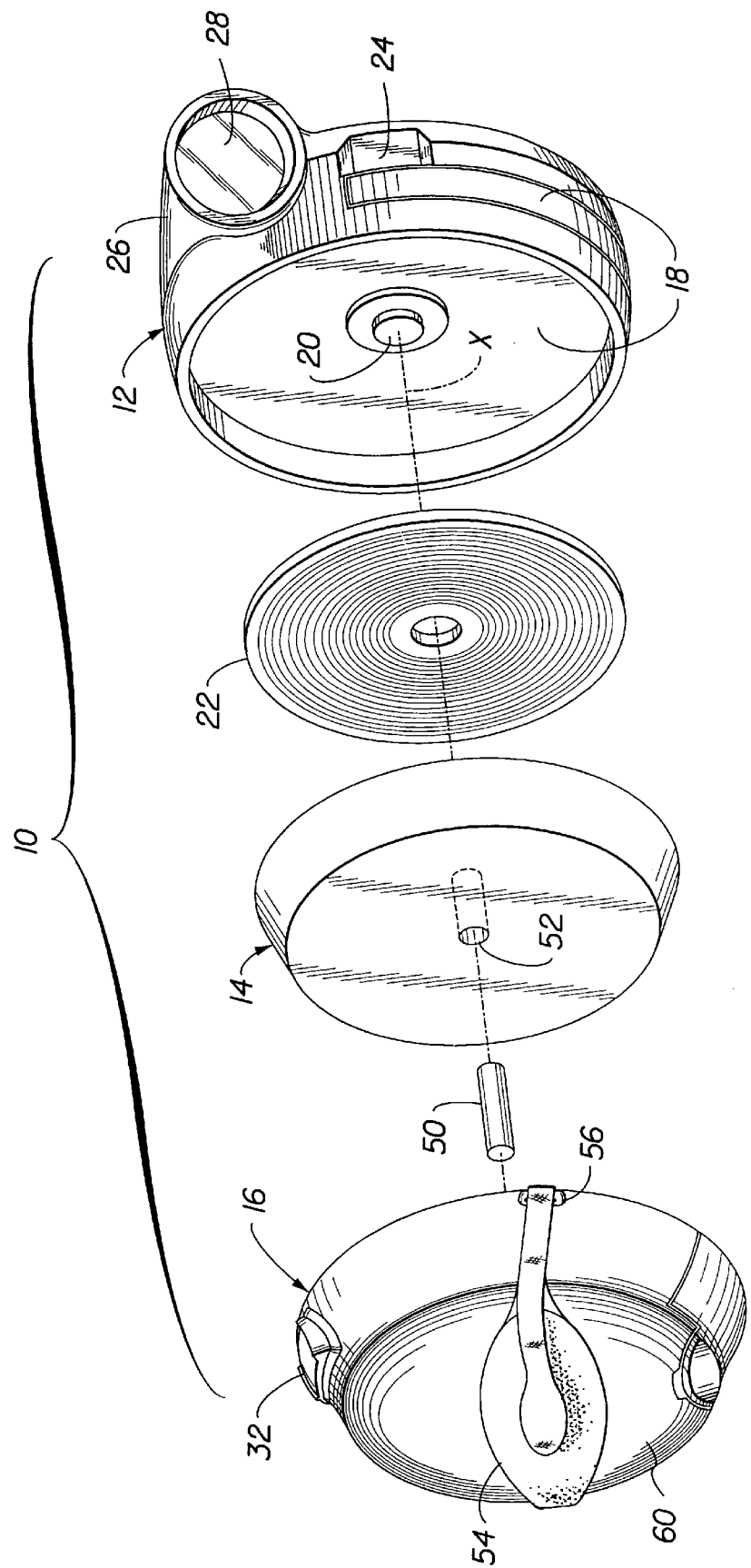
FIG. 1 is an exploded front perspective view of a camera with a variable position handgrip according to a preferred embodiment of the invention.
Figure 2:
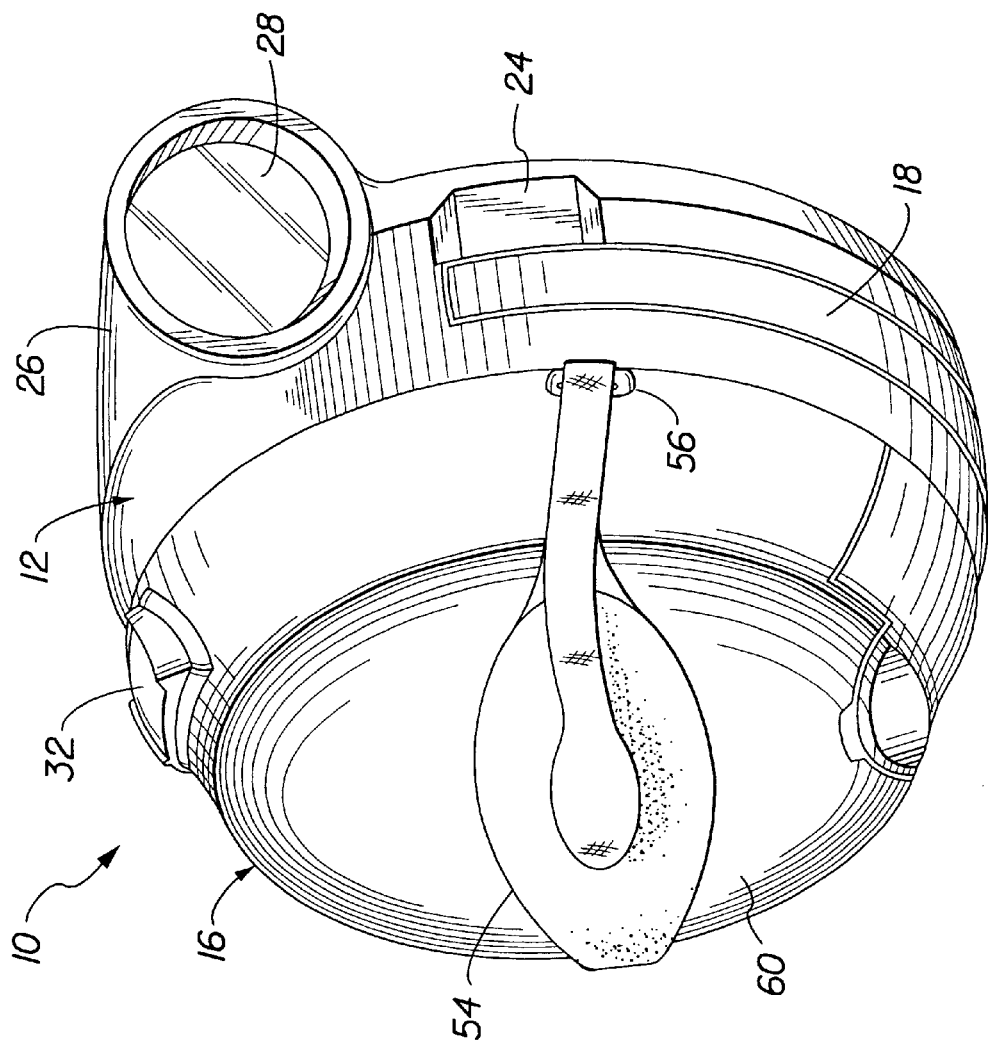
FIG. 2 is an assembled front perspective view of the camera.
Figure 3:
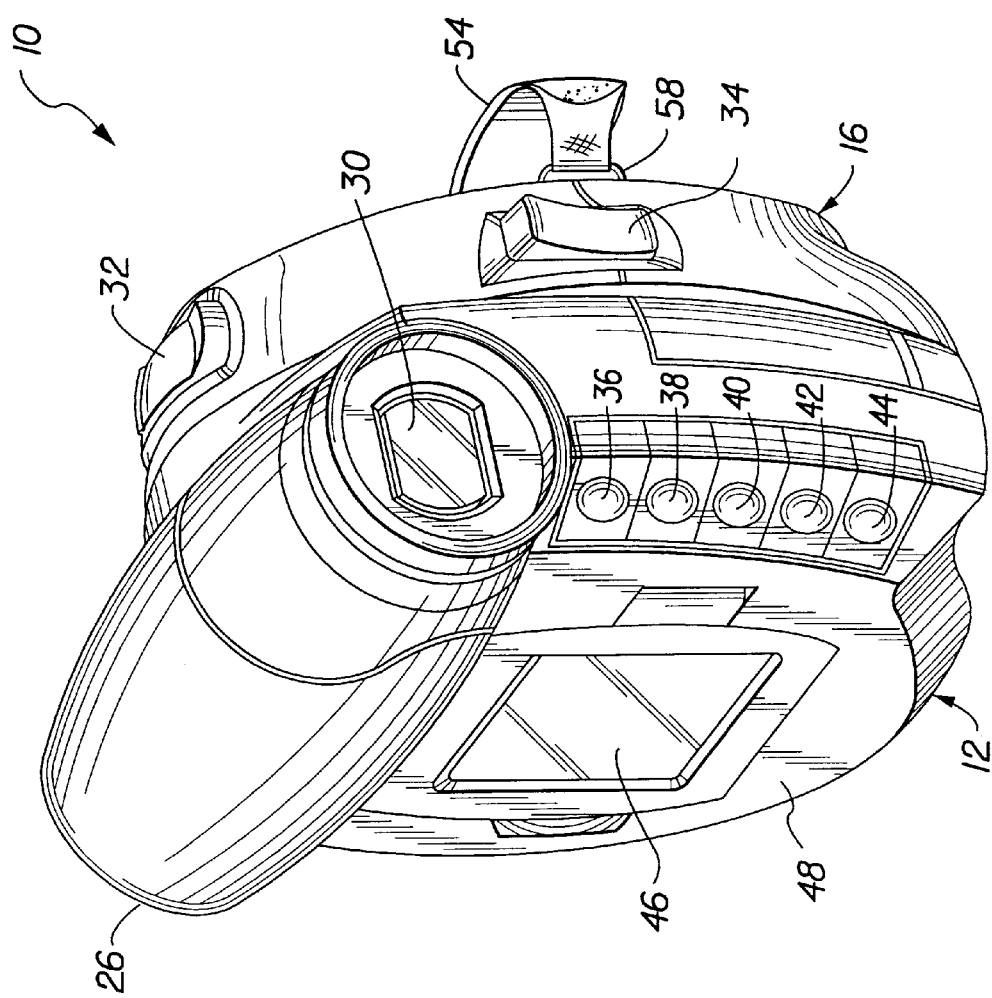
FIG. 3 is an assembled rear perspective view of the camera.

Referring now to the drawings, FIGS. 1–3 show a camcorder-type camera 10 comprising a substantially circular-shaped main body part 12, a circular-shaped internal cover part 14, and a circular-shaped external cover part 16.

The main body part 12 includes a swing-out platen 18 on which is provided a rotatable spindle 20 for supporting an image recording disk in the form of a known digital video disk (DVD) 22. See FIG. 1. The platen 18 is swung outward from the main body part 12 to permit the DVD 22 to be placed on the spindle 20 and then is returned into the main body part. The spindle 20 is motor-rotated about a center axis X to similarly rotate the DVD 22 for image recording and recorded image playback. A known spindle drive mechanism (not shown) is located inside the main body part 12, beneath the platen 18. A two-position unlocking/locking button 24 is provided on the main body part 12 to permit/prevent the platen 18 from being swung outward from the main body part. A known set of record/read heads (not shown) are mounted on the internal cover part 14, opposite the platen 18.

A tubular lens barrel 26 includes a front taking/viewfinder lens 28 and a rear viewfinder lens 30. These two lenses 28 and 30 are elements of a known through-the-lens (TTL) image-forming/viewfinder zoom system. See FIGS. 2 and 3. The viewfinder portion of the system is for viewing a subject to be photographed, and the image-forming portion of the system is for forming an image of the subject to be recorded on the DVD 22. A zoom control button 32 is provided on the external cover part 16 for selecting wide-angle and telephoto imaging.

As shown in FIG. 3, a record button 34 is provided on the external cover part 16 to initiate image recording. In addition, a number of playback function buttons are provided on the main body part 12 for recorded image playback purposes, i.e. a fast forward button 36, a pause button 38, a play button 40, a rewind button 42 and a stop button 44. A known liquid crystal display (LCD) 46 is embedded at one side 48 of the main body part 12, which is used alternatively to view a duplicate of the image of the subject that can be seen through the rear viewfinder lens 30 or to view a recorded image during playback.

A rotation pin 50 has one end rotatably supported within a bearing hole 52 in the internal cover part 14 and an opposite end fixed to the external cover part 16. The rotation pin 50 is coaxially aligned with the spindle 20 to permit the external cover part 16 to be manually rotated about the center axis X. See FIG. 1. An adjustable, flexible, elastic handgrip 54 is secured to the external cover part 16 at respective retainers 56 and 58, as shown in FIGS. 2 and 3, and longitudinally extends across one side 60 of the external cover part. Thus, the handgrip 54 can be rotated with the external cover part 16 to a number of angular positions that permit the user to hold the camera 10 over his or her head, for example, and view an image of the subject to be photographed at the LCD 46.

The invention has been described with reference to a preferred embodiment. However, it will be appreciated that variations and modifications can be effected by a person of ordinary skill in the art without departing from the scope of the invention.

PARTS LIST 10. camera
12. main body part
14. internal cover part
16. external cover part
18. swing-out platen
20. spindle
22. digital video disk
X. center axis
24. unlocking/locking button
26. lens barrel
28. front taking/viewfinder lens
30. rear viewfinder lens
32. zoom control button
34. record button
36. fast forward button
38. pause button
40. play button
42. rewind button

44. stop button
46. liquid crystal display
48. side
50. rotation pin
52. bearing hole
54. handgrip
56. retainer
58. retainer
60. side

What is claimed is:

1. A camera comprising a spindle constructed to support an image recording disk to be rotated about a center axis, and a handgrip which is to be hand held at an angular position, is characterized in that:

said handgrip is supported for rotation about the center axis, about which the image recording disc is rotated, to vary the angular position at which the handgrip is hand held.

2. A camera comprising a main body part which includes a spindle constructed to support an image recording disk to be rotated about a center axis, and a handgrip which is to be hand held at an angular position, is characterized in that:

said main body part is substantially circular-shaped; and an external cover part is similarly shaped, includes said handgrip, and is supported for rotation about the center axis relative to said main body part in order to vary the angular position at which the handgrip is hand held.

3. A camera comprising a spindle constructed to support an image recording disk to be rotated about a center axis, and an external part which is to be hand held at an angular position, is characterized in that:

said external part includes at least one hand-operated button and is supported for rotation about the center axis, about which the image recording disc is rotated, to vary the angular position at which said button may be hand operated.

* * * * *